(12) United States Patent
Buttner et al.

(10) Patent No.: US 8,713,889 B2
(45) Date of Patent: May 6, 2014

(54) ANCHOR BRACKET AND METHOD OF MOUNTING ANCHOR BRACKET

(76) Inventors: Ronald Buttner, Mineola, NY (US); Randall Buttner, East Meadow, NY (US)

( * ) Notice: Subject to any disclaimer, the term of this patent is extended or adjusted under 35 U.S.C. 154(b) by 144 days.

(21) Appl. No.: 13/351,390

(22) Filed: Jan. 17, 2012

(65) Prior Publication Data

US 2012/0180304 A1    Jul. 19, 2012

Related U.S. Application Data

(60) Provisional application No. 61/461,156, filed on Jan. 14, 2011.

(51) Int. Cl.
*E04B 1/38* (2006.01)

(52) U.S. Cl.
USPC .............................................. 52/698; 248/200

(58) Field of Classification Search
USPC ......... 52/698, 699, 712, 715, DIG. 1; 24/546; 248/200, 220.21, 220.22, 227.2; 403/353
See application file for complete search history.

(56) References Cited

U.S. PATENT DOCUMENTS

| | | | | |
|---|---|---|---|---|
| 3,360,075 | A * | 12/1967 | Gutner | 182/106 |
| 3,792,852 | A * | 2/1974 | Reniker | 269/95 |
| 4,047,353 | A * | 9/1977 | Aarons | 52/713 |
| 4,564,182 | A * | 1/1986 | Svajgl | 269/102 |
| 5,398,476 | A * | 3/1995 | Knight | 52/698 |
| 5,800,089 | A * | 9/1998 | Donaton | 403/393 |
| 5,931,426 | A * | 8/1999 | Heckner | 248/220.21 |
| 5,975,239 | A * | 11/1999 | Castaneda | 182/45 |
| 5,979,887 | A * | 11/1999 | Hassman | 269/40 |
| 6,364,303 | B1 * | 4/2002 | Gustavson | 269/37 |
| 6,418,693 | B2 * | 7/2002 | Ballard | 52/589.1 |
| 7,144,004 | B1 * | 12/2006 | Conversa | 269/47 |
| 7,434,329 | B2 * | 10/2008 | Walda | 33/649 |
| 7,546,692 | B2 * | 6/2009 | Simko | 33/647 |
| 8,453,392 | B1 * | 6/2013 | Hurst | 52/127.2 |
| 2005/0246997 | A1 * | 11/2005 | Bishop | 52/522 |
| 2006/0059844 | A1 * | 3/2006 | Ely | 52/698 |
| 2011/0107683 | A1 * | 5/2011 | Ringuette | 52/12 |
| 2012/0187265 | A1 * | 7/2012 | Bakerman | 248/220.22 |
| 2012/0272606 | A1 * | 11/2012 | Gillis | 52/543 |

* cited by examiner

*Primary Examiner* — Brian Glessner
*Assistant Examiner* — Paola Agudelo
(74) *Attorney, Agent, or Firm* — Galgano & Associates, PLLC; Thomas M. Galgano; Jessica G. Bower

(57) ABSTRACT

An anchor bracket releasably securable between two spaced-apart, generally planar boards, having a pair of first and second legs disposed parallel and offset relative to one another, a medial shank disposed between and generally perpendicular to and joining the pair of legs and means for releasably anchoring an object attached to the second leg. A method of mounting the anchor bracket includes the steps of moving the anchor bracket between an insertion/withdrawal position and a mounted anchoring position between a pair of spaced-apart boards.

18 Claims, 5 Drawing Sheets

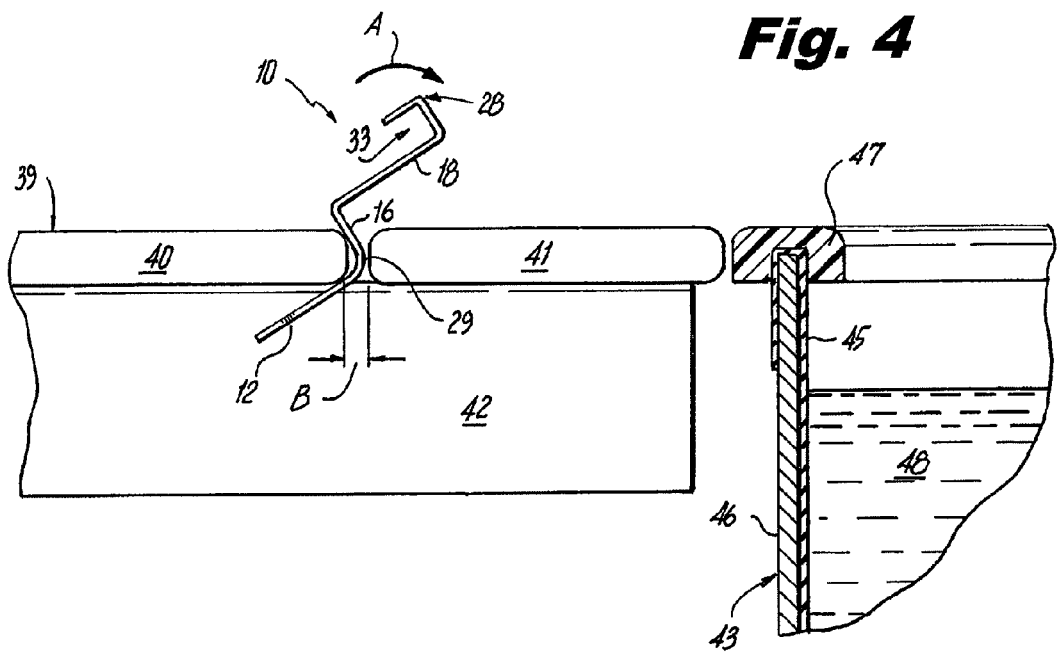
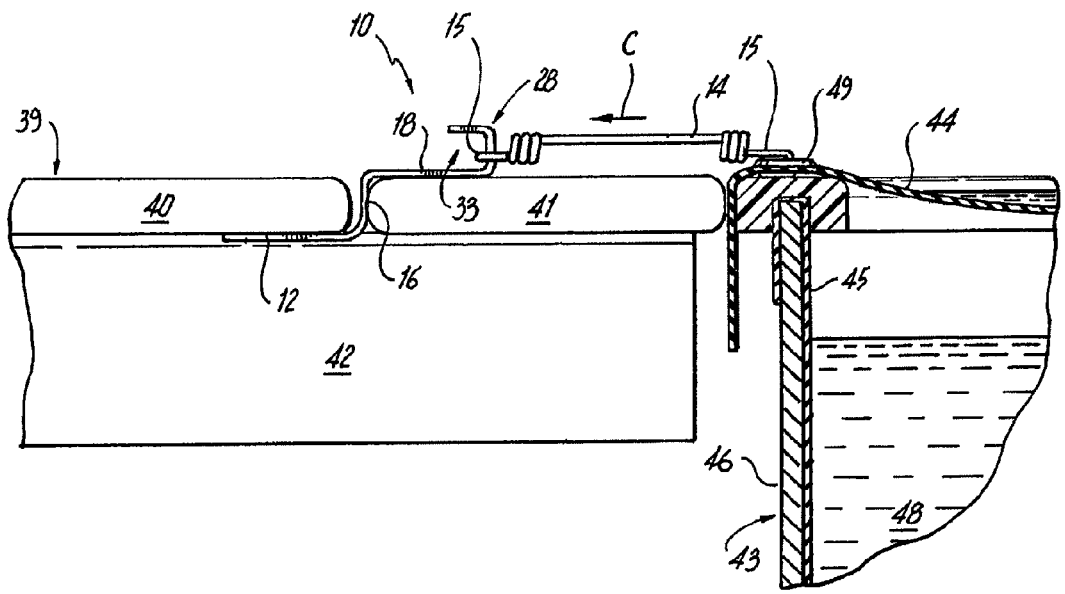

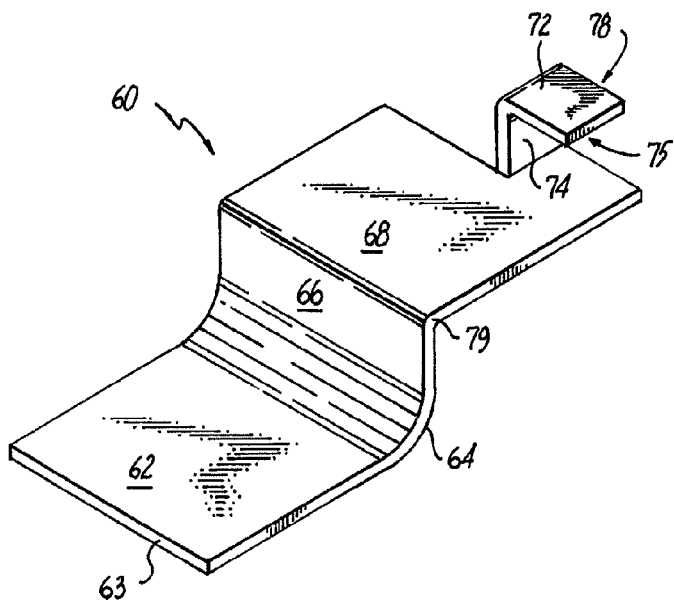
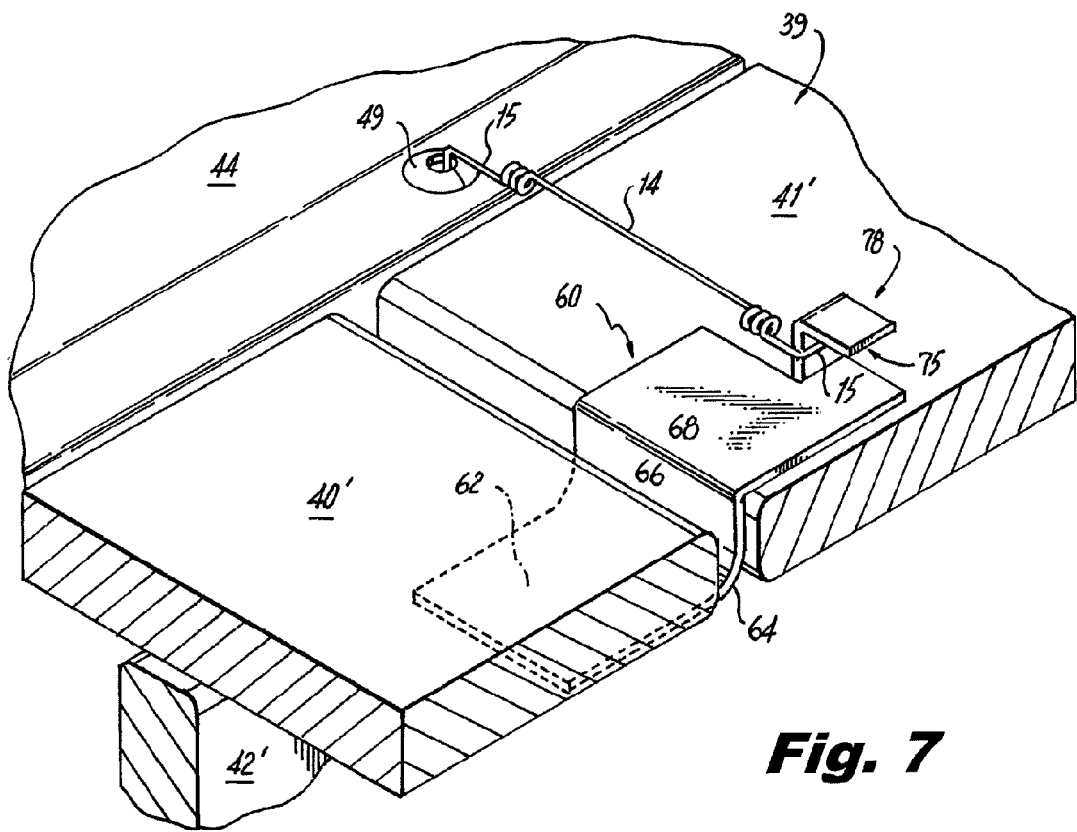

ANCHOR BRACKET AND METHOD OF MOUNTING ANCHOR BRACKET

CROSS-REFERENCE TO RELATED APPLICATION

This application claims benefit from U.S. Provisional Patent Application No. 61/461,156, filed Jan. 14, 2011 the contents of which are hereby incorporated by reference.

BACKGROUND OF THE INVENTION

1. Field of the Invention

The invention relates generally to removable fastening devices. More particularly, the invention relates to an anchor bracket removably securable between at least two spaced-apart boards for the releasable anchoring of an object to the anchor bracket. In addition, the invention relates to a method of mounting the anchor bracket between spaced-apart boards, and thereafter releasably anchoring an object to the anchor bracket.

2. Brief Description of the Prior Art

For homeowners, or other individuals, where two or more spaced-apart boards are provided as a supportive or anchoring surface, e.g. a deck or fence, the need to anchor certain items which are placed either thereon or nearby frequently arises. However, conventional fastening or anchoring means often result in damage to the deck or fence via. e.g., nicking, scratching, and in many cases require nailing or the formation of holes in the deck or fence to mount the fastener.

For instance, often times, the area surrounding a pool is surrounded by a wood deck made up of aligned rows of spaced-apart wood planks or boards. In the off season or at night such pools are typically covered by a tarp for safety considerations and to prevent debris or excess rain from spilling therein. Such tarps often have spaced-apart grommets lining their peripheral edges by which they may be attached to the pool deck by fasteners. Normally, to anchor a tarp to the pool deck requires the fastener to be mounted via a bore or hole in the surface of the deck, which obviously damages the deck, or they otherwise leave behind other damaging marks on the surface of the deck when being mounted or in operation.

SUMMARY OF THE INVENTION

It is therefore an object of the invention to provide a novel anchor bracket.

It is a further object to provide an anchor bracket which can be easily mounted between a pair of spaced-apart boards, namely of a deck, for the releasable anchoring of an object thereto.

It is another object of the invention to provide an anchor bracket which can be mounted on any surface having at least a pair of spaced-apart boards, regardless of the whether the surface is horizontal or vertical.

It is another object of the invention to provide a one-piece anchor bracket which is easy to manufacture.

It is still another object to provide an anchor bracket which can be mounted between spaced-apart boards without leaving any holes or damaging marks on the surface of the boards.

It is yet another object of the invention to provide an easy and facile method of mounting the anchor bracket between spaced-apart boards.

It is a further object of the invention to provide a method for anchoring an object to an anchor bracket which has been mounted between spaced-apart boards.

Certain of the foregoing and related objects are readily attained according to the present invention by the provision of an anchor bracket releasably securable between two spaced-apart, generally planar boards, comprising a planar first leg configured and dimensioned so that it can be inserted between the two spaced-apart boards, said first leg having a first end and an opposite second end; a planar second leg disposed parallel and offset relative to said first leg, said second leg having a first end and an opposite second end; a planar medial shank disposed between and generally perpendicular to said first and second legs, said medial shank having a first end and an opposite second end, wherein said first end of said medial shank is connected to said first end of said second leg, and said second end of said medial shank is connected to said second end of said first leg, said medial shank being configured and dimensioned so that it can be inserted between the two spaced-apart boards; and means for releasably anchoring an object attached to said second leg; wherein said anchor bracket is movable between an insertion/withdrawal position and a mounted anchoring position, wherein in said insertion/withdrawal position said first leg is insertable between the spaced-apart boards and in said mounted anchoring position said medial shank is positioned between the boards and said anchor bracket is pivoted about 90° so that said first leg is disposed beneath and abuts one of the spaced-apart boards, and said second leg overlies and abuts the other of the spaced-apart boards.

Preferably, said second end of said medial shank and said second end of said first leg are connected via a generally rounded corner. Most desirably, said rounded corner has a curvature defined by a radius of about 13/32".

Advantageously, said means for releasably anchoring an item to said anchor bracket comprises a hook. Preferably, said hook is a generally L-shaped hook, having a planar first hook leg disposed generally parallel to and spaced from said second leg of said anchor bracket, and a planar second hook leg joining and disposed between and generally perpendicular to said planar first hook leg and said second leg of said anchor bracket. Desirably, said second leg and said L-shaped hook define a U-shaped channel which opens toward said first end of said second leg. Alternatively, said second leg and said L-shaped hook define a U-shaped channel which opens transversely to said first end of said second leg.

In another embodiment, said second leg has at least one opening extending therethrough and wherein said means for releasably anchoring an item to said anchor bracket comprises the portion of said second leg defining said at least one opening.

Preferably, said second leg has an elevated middle portion located between said first and second ends, and wherein said at least one opening extends therethrough said elevated middle portion, and wherein said elevated middle portion and said opening serves as said means for releasably anchoring an item to said anchor bracket.

In a particular embodiment, said means for releasably anchoring further comprises an elastic bungee-type cord having two ends, with a hook provided at each end, a wire or a rope. Optionally, said means for releasably anchoring an object comprises a fastener which is securable to said anchor bracket via said opening which extends therethrough said elevated middle position of said second leg. Most desirably, said fastener comprises a bolt and nut.

Certain of the foregoing and related objects are readily attained according to the present invention by the provision of a method for mounting an anchor bracket between two spaced-apart boards, the steps comprising providing an anchor bracket having a planar first leg configured and dimensioned so that it can be inserted between the two spaced-apart boards, said first leg having a first end and an opposite second end; a planar second leg disposed parallel and offset relative to said first leg, said second leg having a first end and an opposite second end; a planar medial shank disposed between and generally perpendicular to said first and second legs, said medial shank having a first end and an opposite second end, wherein said first end of said medial shank is connected to said first end of said second leg, and said second end of said medial shank is connected to said second end of said first leg, said medial shank being configured and dimensioned so that it can be inserted between the two spaced-apart boards; and means for releasably anchoring an item to said anchor bracket attached to said second leg; wherein said anchor bracket is movable between an insertion/withdrawal position and a mounted anchoring position, wherein in said insertion/withdrawal position said first leg is insertable between the spaced-apart boards and in said mounted anchoring position said medial shank is positioned between the boards and said anchor bracket is pivoted about 90° degrees so that said first leg is disposed beneath and abuts one of the spaced-apart boards, and said second leg overlies and abuts the other of the spaced-apart boards; inserting said second end of said first leg between the two spaced-apart boards of the deck until said medial shank overlies and abuts one of the spaced-apart boards of the deck; and rotating said second end of said second leg about 90° until said first leg is disposed beneath and abuts one of the spaced-apart boards of the deck, with said medial shank disposed between the two spaced-apart boards of the deck, and said second leg overlying and abutting the other of the spaced-apart boards of the deck.

The method preferably includes the step of anchoring an object to the anchor bracket.

For the embodiment wherein said means for anchoring comprises an L-shaped hook on said second end of said second leg and an elastic bungee-type cord, having hooks on each of its ends, said method preferably comprises the additional step of anchoring said anchor bracket to an object by hooking one hooked end of said elastic bungee-type cord on said L-shaped hook of said anchor bracket, and hooking the opposite hooked end of said elastic bungee-type cord to said object.

For the embodiment wherein said second leg has at least one opening extending therethrough and said means for anchoring comprises a fastener which is securable to said anchor bracket via said opening for releasably anchoring an object to said bracket, the method preferably additionally includes the steps of securing said fasteners to said anchor bracket via said opening in said second leg and securing said fasteners to said object.

For the embodiment wherein said fastener comprises a bolt and a nut, the method desirably includes the additional step of anchoring said anchor bracket to an object, which comprises the steps of placing said bolt through said opening in said second leg and through an opening in said object and tightening said nut on said bolt to secure the object to said anchor.

BRIEF DESCRIPTION OF THE DRAWINGS

Other objects and features of the present invention will become apparent from the detailed description considered in connection with the accompanying drawings, which disclose several embodiments of the invention. It is to be understood that the drawings are to be used for the purpose of illustration only and not as a definition of the limits of the invention.

FIGS. 3-5 are side elevational views, in part section, sequentially illustrating the initial manual insertion, pivoting, and then the final position of the anchor bracket in its fully mounted position;

FIG. 6 is a perspective view of a second embodiment of the anchor bracket of the present invention;

FIG. 7 is a perspective view of the anchor bracket shown in FIG. 6 being used to secure a pool cover to a deck;

DETAILED DESCRIPTION OF THE PREFERRED EMBODIMENTS

Figure 1:
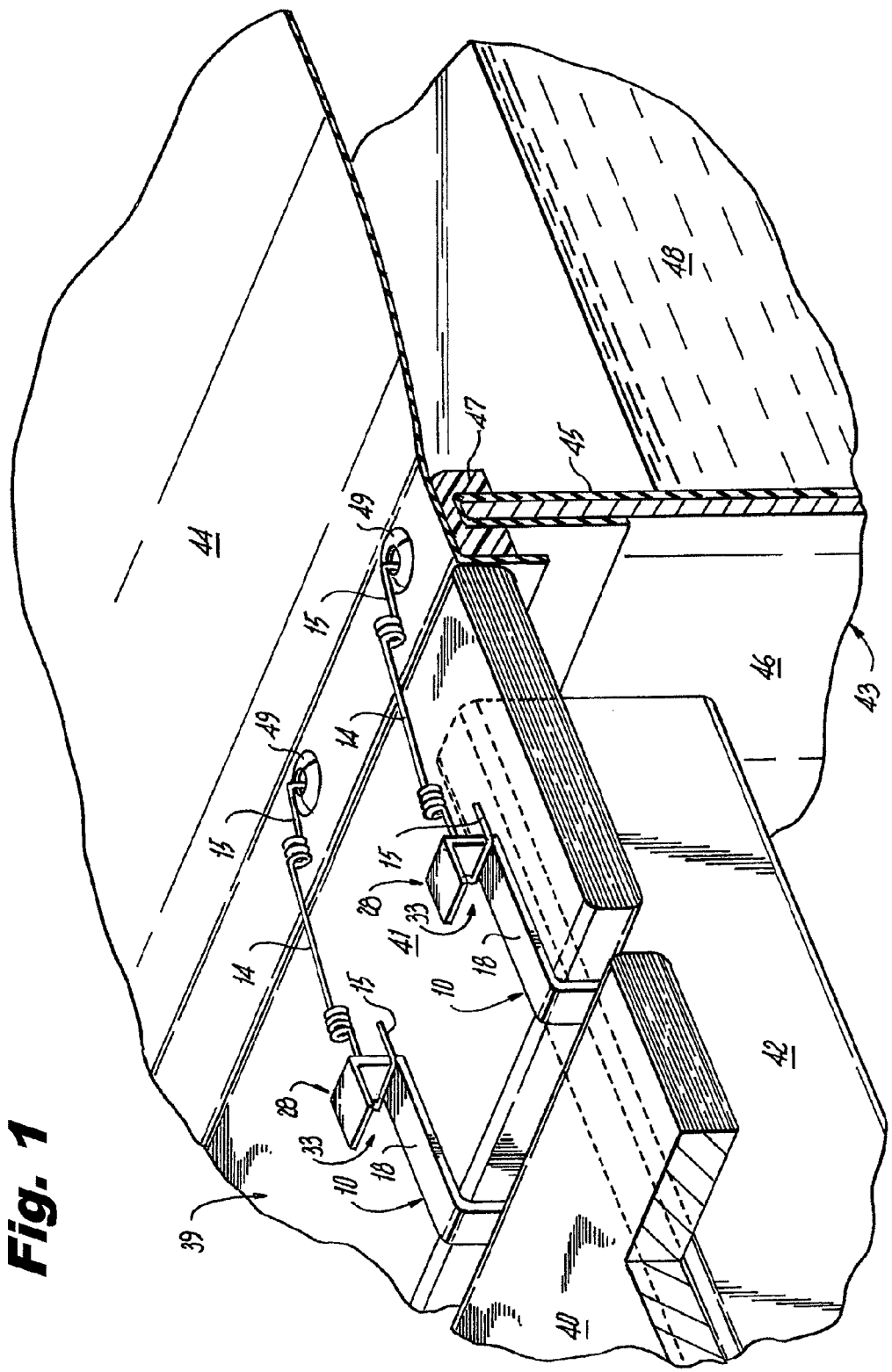
FIG. 1 is a perspective view of a first embodiment of an anchor bracket of the present invention shown being used to secure a pool cover to a deck.

Referring to FIGS. 1-5, therein illustrated is a first embodiment of the anchor bracket of the present invention, generally designated by reference numeral 10, which is removably securable between two adjacent, spaced apart boards 40, 41 of a deck for releasable attachment to a tarp or pool cover 44 of a pool 43 having a sidewall 46 over the upper rim of which is draped the periphery of plastic pool liner 45, which is held in place via a U-shaped pool edge cap 47. As is typical in most cases, even in the off season, the pool 43 remains filled with water 48. The periphery of the pool cover 44 is provided with multiple spaced-apart grommets 49 by which the pool cover 44 can be fastened to the surrounding pool deck 39.

Figure 2:
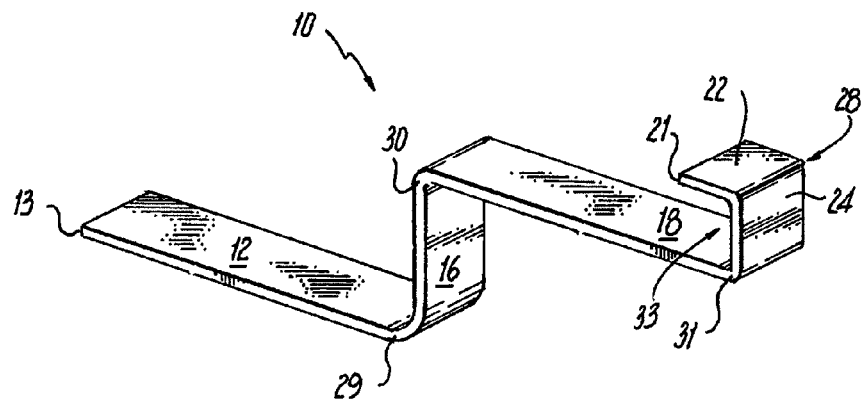
FIG. 2 is a perspective view of the anchor bracket shown in FIG. 1.

As seen best in FIG. 2, a preferably one-piece anchor bracket 10 comprises a planar lower leg 12, a planar upper leg 18, a medial shank 16, and a L-shaped hooked end 28. Anchor bracket 10 has a generally reverse Z-shaped profile, with upper leg 18 and lower leg 12 disposed generally parallel to, but spaced-apart and offset from each other, and a medial shank 16 generally perpendicular to the pair of legs 12 and 18, and joined thereto at its lower and upper ends via preferably rounded corners 29 and 30, respectively.

More particularly, lower leg 12 has a first free end 13 and an opposite inner end merging with the lower end of medial shank 16 via generally rounded corner 29. In a similar fashion, the upper end of medial shank 16 merges with the inner end of upper leg 18 via rounded corner 30. Preferably, rounded corner 29 has a more pronounced curvature to facilitate mounting thereof as described below in relation to FIGS. 3-5. Preferably, rounded corner 29 has a curvature defined by a radius of about 13/32".

The outer end of upper leg 18 is joined to a short, L-shaped hook 28 which comprises a first hook leg 22 disposed generally parallel to, and spaced above, upper leg 18. Hook leg 22 has a free end 21 and an opposite end which is joined to a second hook leg 24, which is generally perpendicular to both first hook leg 22 and upper leg 18. Second hook leg 24 has a lower end which merges with the outer end of upper leg 18 via corner 31. L-shaped hook 28 and upper leg 18 cooperatively define a generally J-shaped hook and U-shaped channel 33, which will serve as a point for the releasable anchoring of an object to anchor bracket 10 as will be described in further detail herein below.

As shown in FIG. 1, two spaced-apart anchor brackets 10, in their fully mounted anchoring position, are secured between two spaced-apart deck boards 40 and 41, releasably anchoring the pool cover 44 of pool 43 to the pool deck 39, which consists of at least two spaced-apart planar boards 40, 41 supported by a cross beam 42 at spaced-apart intervals. When anchor bracket 10 is in the fully mounted position, lower leg 12 (not shown) is disposed beneath and abuts the bottom face of deck board 40, medial shank section 16 is disposed between the two spaced-apart deck boards 40, 41 and upper leg 18 overlies and abuts the upper face of the other spaced-apart deck board 41. In addition, when bracket 10 is in the fully mounted position, L-shaped hook 28 is oriented such that its U-shaped channel 33 faces away from the pool 43 and pool cover 44. Preferably, bracket 10 releasably anchors pool cover 44, via the provision of an elastic spring-loaded bungee like cord 14, which has two opposite hook-like ends 15. One hook end 15 is coupled to L-shaped hook 28 via placement into U-shaped channel 33, and the opposite hook end 15 is hooked into the hole of a grommet 49 of pool cover 44. In practical use, the pool cover 44 is provided with spaced-apart grommets 49 around its periphery and a matching number of anchors 10 would be employed to hold the pool cover 44 in place. However, other suitable means of anchoring pool cover 44 to anchor bracket 10 are possible.

Figure 3:
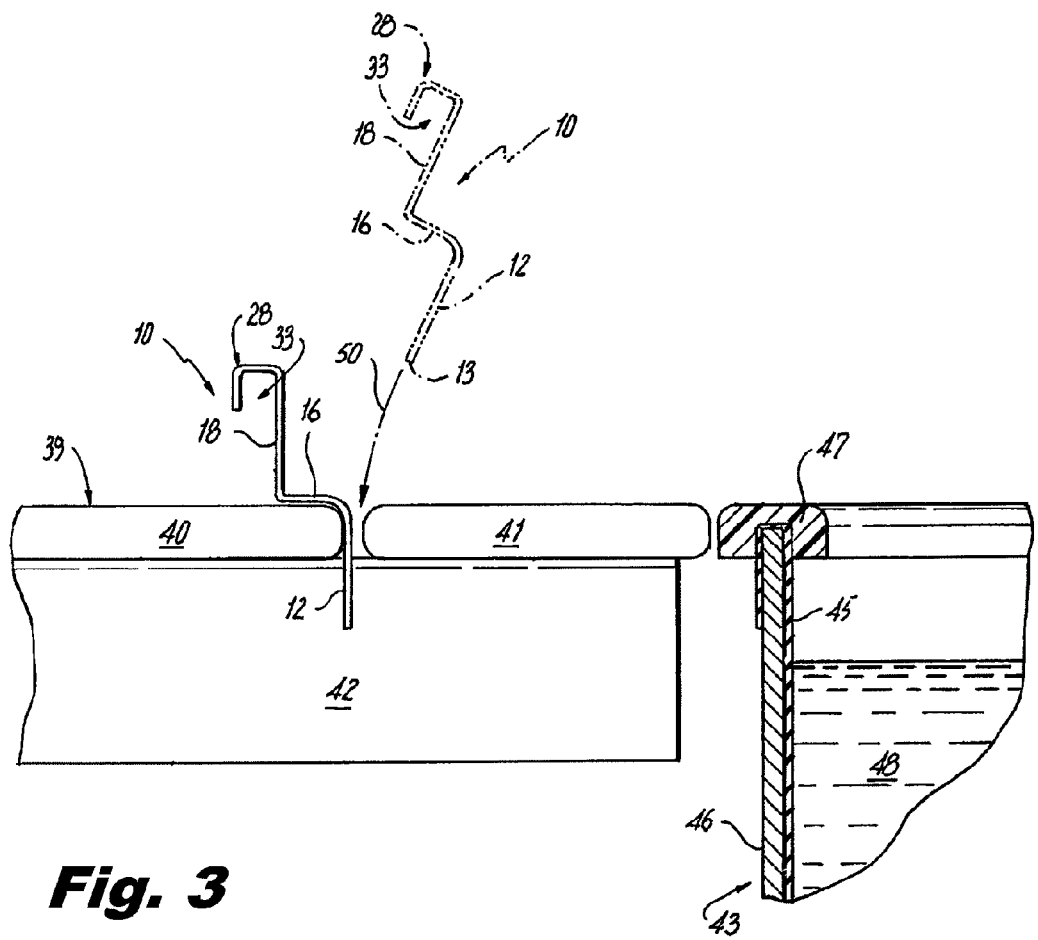

Referring to FIGS. 3-5, therein sequentially illustrated is a three-step method of securing the bracket 10 between the two spaced-apart boards 40, 41 of pool deck 39 and releasably anchoring bracket 10 to pool cover 44. Particularly, as shown in FIG. 3, in step one, anchor bracket 10 (shown initially in phantom view) is moved downwardly (arrow 50) toward the space between the spaced-apart deck boards 40, 41 and the free end 13 of lower leg 12 is inserted into the space and placed between the two spaced-apart deck boards 40 and 41. In this insertion/withdrawal position, medial shank section 16 overlies and abuts the upper face of deck board 40, and lower and upper legs 12 and 18 are generally perpendicular to spaced-apart deck boards 40, 41.

As depicted in FIG. 4, anchor bracket 10 is then manually pivoted in the direction of arrow A so as to orient the medial shank 16 to permit it to be lowered into the space between the boards 40, 41. This dual pivoting and insertion step is facilitated by the pronounced curvature of rounded corner 29, which is dimensioned and configured to accommodate the width of space between boards 40, 41 defined by arrows B. During this pivoting step, the lower leg 12 pivots toward the underside of board 40 while upper leg 18 pivots toward the upper face of board 41.

As shown in FIG. 5, when anchor bracket 10 has been rotated about 90° from its orientation in the insertion/withdrawal position (FIG. 3), anchor bracket 10 reaches its fully mounted anchoring position. When anchor bracket 10 is in the fully mounted anchoring position, the lower leg 12 is disposed beneath and abuts the lower face of deck board 40, medial shank 16 is disposed between the two spaced-apart deck boards 40, 41 and upper leg 18 overlies and abuts the upper face of the other spaced-apart deck board 41. A snug but releasable fit is achieved by providing the medial shank with a length that generally matches the thickness of boards 40, 41, thereby providing a solid anchor for anchor bracket 10 as will be described further herein below.

When bracket 10 is in the fully mounted anchoring position, L-shaped hook 28 is oriented such that its U-shaped channel 33 faces away from the pool 43 and pool cover 44. One end 15 of elastic bungee end 14 is placed within grommet 49 of pool cover 44, and elastic bungee-type cord 14 is stretched in the direction of arrow C until its opposite end 15 is received within U-shaped channel 33 and held by L-shaped hook 28. As a result, pool cover 44 is securely anchored to anchor bracket 10 via the tension generated by the coupling of elastic bungee-type cord 14 to L-shaped hook 28 and grommets 49 of pool cover 44. As can be appreciated, as a result of the use of anchor bracket 10, pool cover 44 is releasably anchored to the pool deck 39 and is held securely in place without making any damaging marks to boards 40, 41 of the pool deck 39.

FIGS. 6 and 7 illustrate a slightly modified second version of the anchor bracket according to the present invention. Referring now to FIG. 6, anchor bracket 60 is constructed in the same general manner as the first embodiment, and comprises a planar lower leg 62, an upper planar leg 68, a medial shank 66, and a L-shaped hook 78. However, lower leg 62, upper leg 68 and medial shank 66 are generally wider than the lower leg 12, upper leg 18 and medial shank 16 of the first embodiment, enabling L-shaped hook 78 to define a U-shaped channel 75 opening in about a 90° offset direction from that of the U-shaped opening 33 of L-shaped hook 28 of the first embodiment, but still allowing the anchor bracket 60 to be made in one piece as in the first embodiment as will be described below. Like the first embodiment as shown in FIG. 2, anchor bracket 60 has a generally reverse Z-shaped profile with planar lower leg 62 and planar upper leg 68, disposed generally parallel to, but spaced-apart and offset from each other, and medial shank 66 generally perpendicular to, and joining the pair of legs 62 and 68.

Lower leg 62 has a first free end 63, and an opposite inner end which merges with the lower end of medial shank 66 via a pronounced rounded corner 64 which preferably has a curvature defined by a radius of about ¹³⁄₃₂". The upper end of medial shank 66 is connected to an inner end of upper leg 68 via a slightly rounded corner 79. Like the rounded corner 29 in the first embodiment, rounded corner 64 is sized and dimensioned to allow medial shank 66 and generally rounded corner 64 to pivot from the insertion/withdrawal position to the fully mounted anchoring position.

As it can be appreciated, due to their generally similar construction, anchor bracket 60 is secured between the spaced apart-boards of deck 39 in the exact manner as anchor bracket 10 of the first embodiment as described in relation to FIGS. 3-5.

As shown in FIG. 7, anchor bracket 60 is in its fully mounted anchoring position, secured between the two spaced-apart boards 40', 41' of the same deck 39. Anchor bracket 60 is similarly mounted with lower leg 62 disposed beneath and abutting the bottom face of deck board 40', medial shank 66 disposed in between the spaced-apart deck boards 40', 41' and upper leg 68 disposed overlying and abutting the upper face of deck board 41'. However, unlike FIG. 1, the spaced-apart boards 40', 41' have a longitudinal axis which runs perpendicular in relation to the pool perimeter and the pool cover 44. As can be appreciated, typically a pool deck may surround a rectangular pool with all of the deck boards arranged in the same direction. Consequently, the boards along the opposite sides of the pool are either parallel (FIG. 1) or perpendicular (FIG. 7) to the pool edge. Therefore, it can be appreciated that anchor bracket 60 is constructed such that L-shaped hook 78 and U-shaped channel 75 still face away from the pool (not shown) and pool cover 44 when in the fully mounted position (FIG. 7) even though the boards 40', 41' along this pool edge run perpendicular thereto. Thus, if a pool owner has a decking surface with boards that are orientated in parallel or perpendicular relation, or both, a pool cover can be securely but releasably anchored thereto via a combination of anchor brackets 10 and 60. Furthermore, employing a wider bracket 60 permits the L-shaped hook 78 to be stamped and made from the same sheet of metal used to make bracket 60 so that it is still made as a one-piece anchor bracket.

Figure 8:
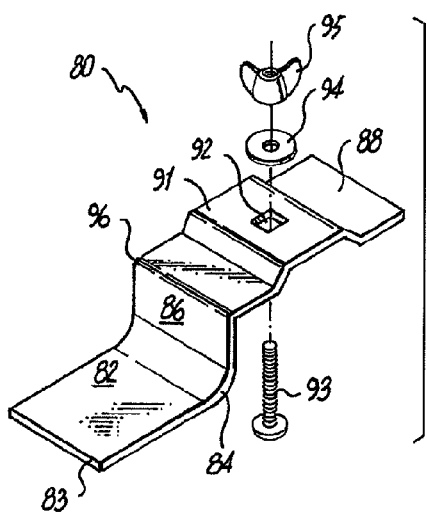
FIG. 8 is an exploded, perspective view of a third embodiment of the anchor bracket of the present invention.
Figure 9:
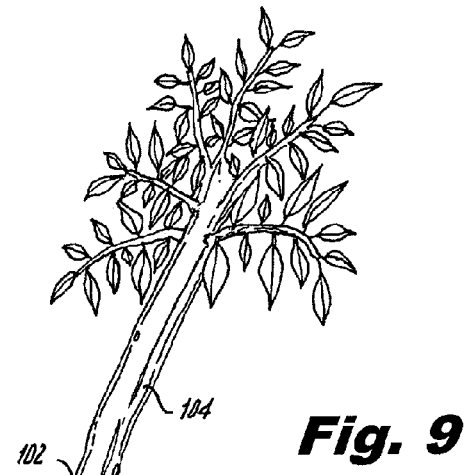
FIG. 9 is a perspective view, with portions cut away to show interior structure, and showing a plurality of the anchor brackets of FIG. 8 being used to secure a potted tree to a deck.

Referring to FIGS. 8 and 9, therein illustrated is an alternate third embodiment of the anchor bracket of the present invention, generally designated by the numeral 80, which is constructed in the same general manner as the anchor brackets 10 and 60 of the first and second embodiments, respectively. As seen in FIG. 8, anchor bracket 80 comprises a planar lower leg 82, an upper leg 88, and a medial shank 86. Like anchor brackets 10 and 60, anchor bracket 80 has a generally reverse Z-shaped profile. However, instead of a hook-shaped end disposed on upper leg 88, anchor bracket 80 has an elevated middle portion 91 with an opening 92 therethrough, for the releasable anchoring of an object.

Lower leg 82 and upper leg 88 are disposed generally parallel to, but spaced-apart and offset from each other, and medial shank 86 is generally perpendicular to, and joins lower leg 82 and upper leg 88. As in the other embodiments, lower leg 82 has a free end 83 and an opposite inner end which merges with the lower end of medial shank 86 via a rounded corner 84. The upper end of medial shank 86 is connected to the inner end of upper leg 88 via a slightly rounded corner 96. Here too, the length of the medial shank 86 is sized generally to match the thickness of the deck boards 40, 41.

As in anchor brackets 10 and 60, rounded corner 84 preferably has a more pronounced curvature, preferably defined by a radius of about 13/32". Like the rounded corners 29 and 64 of anchor brackets 10 and 60, rounded corner 84 is sized and dimensioned to allow medial shank 86 to pivot from the insertion/withdrawal position, to the fully mounted anchoring position.

As it can be appreciated, due to their generally similar construction, anchor bracket 80 is secured between the spaced-apart boards 40, 41 of a deck in the exact same manner as anchor brackets 10 and 60 of the first and second embodiments. Unlike anchor brackets 10 and 60, once in the fully mounted anchoring position, bolt 93 extends through opening 92, and a washer 94 and nut 95 are used to releasably anchor an object to anchor bracket 80 as will be described further below.

As shown in FIG. 9, therein illustrated are a plurality of anchor brackets 80, shown in their fully mounted anchoring position, between the spaced-apart boards 40, 41 of a pool deck 39 with two different means of anchoring an object, e.g., a tree 104 and soil-filled planter 106, respectively, to anchor bracket 80. The first means is generally similar to the anchoring as shown in connection with anchor brackets 10 and 60. However, instead of an elastic bungee type-cord coupled to a hook, rope or wire 100 is coupled to anchor bracket 80 at one end preferably by a hook or ring at its end, and to an object (e.g., a ring or hook attached to it) at its other end. More particularly, one end of wire 100 (or a ring or hook attached thereto) is placed over or around bolt 93, and washer 94 and nut 95 are tightened down thereon, and the opposite end of wire 100 is secured to a ring 102 which encircles tree 104. Tree 104 is securely anchored via two anchor brackets 80, and is held upright without leaving any damaging marks on the pool deck 39.

In addition, a direct anchoring connection between anchor bracket 80 and an object (a pot or planter 106, for example) is also shown. An anchor 80 is positioned or mounted on the pool deck 39 between the center boards 40, 41 in the manner as described above, where planter 106 is to be placed. A hole (not shown) is provided in the bottom or base 108 of the soil-filled planter 106, and bolt 93 of anchor bracket 80 is positioned to project upwardly therethrough opening 92 of upper leg 88 and the planter hole (not shown), and in turn, washer 94 and nut 95 are tightened down thereon. Therefore, soil-filled planter 106 is securely anchored to anchor bracket 80 and it will not topple over, without leaving any damaging marks on the pool deck 39.

The anchor bracket is preferably composed of stainless steel, although other suitable constructions materials may be utilized. The boards of the deck are preferably spaced apart at least ¼ of an inch, for placement of the anchor bracket therebetween, although the size and dimension of the boards, and/or the anchor bracket, may be altered to correspond to one another. The anchor bracket may be utilized to releasably anchor any object placed thereon, or nearby, a surface which has spaced-apart boards. The means for anchoring an object to the anchor bracket can comprise any anchor means disposed on the second leg of the anchor bracket. Two anchor brackets may also be positioned such that their means for anchoring are positioned back-to-back and abutting one another above one board, thereby effectively forming a double hook with double the anchoring strength. Moreover, while the anchor bracket is especially designed for pool decks, it can also be used for a multitude of different applications, such as in fences having spaced-apart boards. The only essential requirement is that there be two-spaced apart boards or other comparable structure to which the anchor brackets can be releasably mounted as described herein.

While particular embodiments of the invention have been described, it is not intended that the invention be limited thereto, as it is intended that the invention be as broad in scope as the prior art will allow and that the specification be read likewise. It will therefore be appreciated by those skilled in the art that other modifications could be made thereto without departing from the spirit and scope of the invention.

We claim:

1. An anchor bracket releasably secured between two spaced-apart, generally planar boards, comprising:
    a planar first leg configured and dimensioned so that it can be inserted between the two spaced-apart boards, said first leg having a first end and an opposite second end;
    a planar second leg disposed parallel and offset relative to said first leg, said second leg having a first end and an opposite second end, and said second leg having an upper surface disposed distally from said first leg and an opposite lower surface disposed proximally to said first leg;
    a planar medial shank disposed between and generally perpendicular to said first and second legs, said medial shank having a first end and an opposite second end, wherein said first end of said medial shank is connected to said first end of said second leg, and said second end of said medial shank is connected to said second end of said first leg, said medial shank being configured and dimensioned so that it can be inserted between the two spaced-apart boards; and
    means for releasably anchoring an object which are attached to said second leg comprising a hook which extends outwardly from said upper surface of said second leg, wherein said hook is a generally L-shaped hook, having a planar first hook leg disposed generally parallel to and spaced from said second leg of said anchor bracket, and a planar second hook leg joining and disposed between and generally perpendicular to said planar first hook leg and said second leg of said anchor bracket;
    wherein said anchor bracket is movable between an insertion/withdrawal position and a mounted anchoring position, wherein in said insertion/withdrawal position said first leg is insertable between the spaced-apart boards and in said mounted anchoring position said medial shank is positioned between the boards and said anchor bracket is pivotable about 90 degrees so that said first leg is disposed beneath and abuts one of the spaced-apart boards, and said second leg overlies and abuts the other of the spaced-apart boards.

2. The anchor bracket according to claim 1, wherein: said second leg and said L-shaped hook define a U-shaped channel which opens toward said first end of said second leg.

3. The anchor bracket according to claim 1, wherein: said second leg and said L-shaped hook define a U-shaped channel which opens transversely to said first end of said second leg.

4. The anchor bracket according to claim 1, wherein: said means for releasably anchoring further comprises, an elastic bungee-type cord having two ends, with a hook provided at each end.

5. The anchor bracket according to claim 1, wherein: said means for releasably anchoring further comprises a wire.

6. The anchor bracket according to claim 1, wherein: said means for releasably anchoring further comprises a rope.

7. A method for mounting an anchor bracket between two spaced-apart boards, the steps comprising:
providing an anchor bracket having a planar first leg configured and dimensioned so that it can be inserted between the two spaced-apart boards, said first leg having a first end and an opposite second end; a planar second leg disposed parallel and offset relative to said first leg, said second leg having a first end and an opposite second end; a planar medial shank disposed between and generally perpendicular to said first and second legs, said medial shank having a first end and an opposite second end, wherein said first end of said medial shank is connected to said first end of said second leg, and said second end of said medial shank is connected to said second end of said first leg, said medial shank being configured and dimensioned so that it can be inserted between the two spaced-apart boards; and means for releasably anchoring an item to said anchor bracket attached to said second leg comprising a hook and an elastic bungee-type cord having two ends, with a hook provided at each end; wherein said anchor bracket is movable between an insertion/withdrawal position and a mounted anchoring position, wherein in said insertion/withdrawal position said first leg is insertable between the spaced-apart boards and in said anchoring position said medial shank is positioned between the boards and said anchor bracket is pivotable about 90 degrees so that said first leg is disposed beneath and abuts one of the spaced-apart boards, and said second leg overlies and abuts the other of the spaced-apart boards;
inserting said second end of said first leg between the two spaced-apart boards of the deck until said medial shank overlies and abuts one of the spaced-apart boards of the deck; and
rotating said second end of said second leg about 90 degrees until said first leg is disposed beneath and abuts one of the spaced-apart boards of the deck, with said medial shank disposed between the two spaced-apart boards of the deck, and said second leg overlying and abutting the other of the spaced-apart boards of the deck.

8. The method according to claim 7, including the step of anchoring an object to the anchor bracket.

9. The method according to claim 8, wherein said means for anchoring comprises an L-shaped hook on said second end of said second leg, and wherein said method comprises the additional step of:
anchoring said anchor bracket to an object by hooking one hooked end of said elastic bungee-type cord on said L-shaped hook of said anchor bracket, and hooking the opposite hooked end of said elastic bungee-type cord to said object.

10. The method according to claim 9, further comprising:
providing a second anchor bracket releasably securable between two spaced-apart, generally planar boards, comprising a planar first leg configured and dimensioned so that it can be inserted between the two spaced-apart boards, said first leg having a first end and an opposite second end;
a planar second leg disposed parallel and offset relative to said first leg, said second leg having a first end, an opposite second end, and at least one opening extending therethrough;
a planar medial shank disposed between and generally perpendicular to said first and second legs, said medial shank having a first end and an opposite second end, wherein said first end of said medial shank is connected to said first end of said second leg, and said second end of said medial shank is connected to said second end of said first leg, said medial shank being configured and dimensioned so that it can be inserted between the two spaced-apart boards; and
means for releasably anchoring an object attached to said second leg comprising a fastener which is securable to said anchor bracket via said opening for releasably anchoring an object to said bracket and wherein said method comprises the additional step of:
securing said fastener to said anchor bracket via said opening in said second leg and securing said fastener to said object.

11. The method according to claim 10, wherein said fastener comprises a bolt and a nut, and said additional step of anchoring said anchor bracket to an object comprises the steps of:
placing said bolt through said opening in said second leg and through an opening in said object and tightening said nut on said bolt to secure the object to said anchor.

12. An anchor bracket releasably securable between two spaced-apart, generally planar boards, comprising:
a planar first leg configured and dimensioned so that it can be inserted between the two spaced-apart boards, said first leg having a first end and an opposite second end;
a planar second leg disposed parallel and offset relative to said first leg, said second leg having a first end and an opposite second end;
a planar medial shank disposed between and generally perpendicular to said first and second legs, said medial shank having a first end and an opposite second end, wherein said first end of said medial shank is connected to said first end of said second leg, and said second end of said medial shank is connected to said second end of said first leg, said medial shank being configured and dimensioned so that it can be inserted between the two spaced-apart boards; and
means for releasably anchoring an object attached to said second leg comprising a hook and an elastic bungee-type cord having two ends, with a hook provided at each end;
wherein said anchor bracket is movable between an insertion/withdrawal position and a mounted anchoring position, wherein in said insertion/withdrawal position said first leg is insertable between the spaced-apart boards and in said mounted anchoring position said medial shank is positioned between the boards and said anchor bracket is pivotable about 90 degrees so that said first leg is disposed beneath and abuts one of the spaced-apart boards, and said second leg overlies and abuts the other of the spaced-apart boards.

13. The anchor bracket according to claim 12, wherein:
said second end of said medial shank and said second end of said first leg are connected via a generally rounded corner.

14. The anchor bracket according to claim 13, wherein:
said rounded corner has a curvature defined by a radius of about $13/32''$.

15. The anchor bracket according to claim 12, wherein further comprising:
- a second anchor bracket releasably securable between two spaced-apart, generally planar boards, comprising a planar first leg configured and dimensioned so that it can be inserted between the two spaced-apart boards, said first leg having a first end and an opposite second end;
- a planar second leg disposed parallel and offset relative to said first leg, said second leg having a first end, an opposite second end, and at least one opening extending therethrough;
- a planar medial shank disposed between and generally perpendicular to said first and second legs, said medial shank having a first end and an opposite second end, wherein said first end of said medial shank is connected to said first end of said second leg, and said second end of said medial shank is connected to said second end of said first leg, said medial shank being configured and dimensioned so that it can be inserted between the two spaced-apart boards; and
- means for releasably anchoring an object to said second leg comprising a portion of said second leg defining said at least one opening.

16. The anchor bracket according to claim 15, wherein:
said second leg has an elevated middle portion located between said first and second ends, and wherein said at least one opening extends therethrough said elevated middle portion, and wherein said elevated middle portion and said opening serves as said means for releasably anchoring an item to said anchor bracket.

17. The anchor bracket according to claim 16, wherein:
said means for releasably anchoring an object further comprises a fastener which is securable to said anchor bracket via said opening which extends therethrough said elevated middle portion of said second leg.

18. The bracket according to claim 17, wherein:
said fastener comprises a bolt and nut.

* * * * *